March 23, 1965   J. J. ZAHURANEC   3,174,508
DOUBLE-END SHUT-OFF QUICK-CONNECT TUBE COUPLING
Filed Dec. 7, 1962

INVENTOR.
JERRY J. ZAHURANEC
BY
*Fay & Fay*
ATTORNEYS

United States Patent Office 3,174,508
Patented Mar. 23, 1965

3,174,508
DOUBLE-END SHUT-OFF QUICK-CONNECT
TUBE COUPLING
Jerry J. Zahuranec, Solon, Ohio, assignor to Crawford
Fitting Company, Cleveland, Ohio, a corporation of
Ohio
Filed Dec. 7, 1962, Ser. No. 249,105
10 Claims. (Cl. 137—614.04)

This invention concerns an improved double-end shut-off quick connect tube coupling having a hollow-valved male stem member and an associated hollow-valved female body member capable of engagement or disengagement therewith by a one-handed operation.

In its broadest sense, the tube coupling of this invention comprises a hollow-valved male stem having a hollow-valved female body rotatably mounted thereon and longitudinally slidable thereto during coupling and uncoupling. Radial openings are provided in an extension portion of the female body and a plurality of detents are disposed therein. A detent-receiving locking groove is provided on the periphery of the stem and a detent releasing and locking sleeve normally is spring-urged into releasing position on the body. A second spring-urged sleeve is provided on the stem for forcing and maintaining the releasing and locking sleeve on the body in locking position. The hollow male stem has a valve with a movable portion which is acted on by spring means of one force magnitude to urge the stem valve closed and the hollow female body has a valve with a movable portion which is acted on by spring means of an opposite and greater force magnitude to urge the body valve closed. The spring-urged portion of the stem valve abuts the spring-urged portion of the body valve during coupling thereby to open the stem valve by means of the opposite and greater force magnitude acting to urge the body valve closed. The stem is dimensioned such that an end portion thereof engages the spring-urged portion of the body valve when coupled to maintain the valve open against the force acting to urge it closed.

The arrangement of the various elements of the coupling, accordingly, insures that the stem valve opens before the body valve opens and that the body valve closes before the stem valve closes. The detent locking and releasing mechanism permits this automatic sequence during one-handed coupling or uncoupling of the valved stem and valved body and also permits positive locking of the stem and body in any radial position. In addition, the coupling structure of this invention permits swiveling of the coupled stem and body members and prevents substantial flow through the coupling valves until the members are sealed and locked positively by the detent mechanism.

The prior art double-end shut-off tube couplings generally have not been adapted for use in high pressure lines and have leaked when so used because of the lack of a positive action sequence which prevents substantial flow through the coupling until the components are firmly locked in coupled relationship. Several attempts have been made to solve this long standing problem in the art; however, all have resulted in a compromise between the ease of coupling and the positive action of the valves. These prior attempts to produce high pressure system double-end shut-off valves have resulted either in valves which leak before the locked coupling engagement is accomplished, or which have inconvenient and complicated separate coupling and valve actuation means. Moreover, the prior art double-end shut-off couplings heretofore devised for shutting off two ends of a high pressure line system upon uncoupling of the ends, have been expensive to manufacture and assemble because of complex internal machining and assembly operations required, and have been costly to maintain in working order because of the lack of ease of disassembly for cleaning.

A most important aspect of applicant's improved double-end shut-off tube coupling is that the positive sequential action of the shut-off valves prevents substantial flow into the coupling until a sealing and locking engagement is assured, without compromising the inherent convenience of a one-handed connecting operation which may be effected in any radial position.

A further important advantage of the improved double-end shut-off quick-connect coupling of this invention is the fact that it may be swiveled to any convenient position when coupled in locked engagement. This feature is extremely important when it is considered that often a great number of valves must be mounted in closely spaced array on instrument panels to effect the necessary functions of the instruments in the smallest possible space.

A further advantage of the invention is found in the fact that the valves of the coupling are forced positively into closed position upon uncoupling by means of both a spring force and a force exerted by the line pressure behind it, and further that the seals of the coupling are wiped into their seats during the uncoupling operation.

Additionally, the design of applicant's double-end shut-off quick-connect coupling provides for inexpensive manufacturing in that it eliminates internal machining of seal seats or grooves by utilizing a composite seal structure within the female body.

Furthermore, the double-end shut-off quick connect tube coupling of this invention permits convenient access for cleaning and maintenance of the components in that the body member comprises a simple, unrestricted ball valve structure and the male stem member is disassembled easily for access to its various internal components.

With the problems of the prior art devices in mind, it is a general object of this invention to provide an improved double-end shut-off quick-connect coupling capable of positive valve opening and shutting action during one-handed connection or disconnection operations.

It is a further object of the invention to provide a double-end shut-off quick-connect tube coupling capable of assembly by a one-handed operation such that substantial flow through the coupling does not occur until the coupling elements are in firmly locked engagement.

It is a further object of the invention to provide a double-end shut-off quick-connect tube coupling capable of one-handed assembly into a positive locking engagement in any radial position.

It is a further object of the invention to provide a double-end shut-off quick-connect tube coupling assembly which effects a seal between the members thereof before the valves open.

It is a further object of the invention to provide a double-end shut-off quick-connect tube coupling in which the valves are urged closed by both the force of line pressure and the force of valve springs.

It is an additional object of the invention to provide a double-end shut-off quick-connect tube coupling in which the coupling parts may be swiveled with respect to each other when in locked engagement.

It is a further object of the invention to provide a double-end shut-off quick-connect tube coupling in which the valves are maintained in positive open position even when under the effects of high pressure.

It is an additional object of the invention to provide a double-end shut-off quick-connect tube coupling inexpensive to manufacture and maintain.

It is a further object of the invention to provide a double-end shut-off quick-connect tube coupling capable of use in either high pressure or vacuum systems.

Other and more specific objects of the invention will be apparent from the detailed description to follow.

Figure 1:
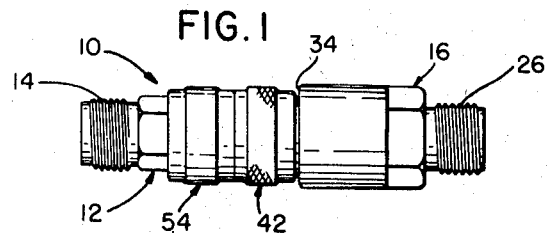
FIG. 1 is a plan view of the double-end shut-off quick-connect tube coupling of the invention.
Figure 2:
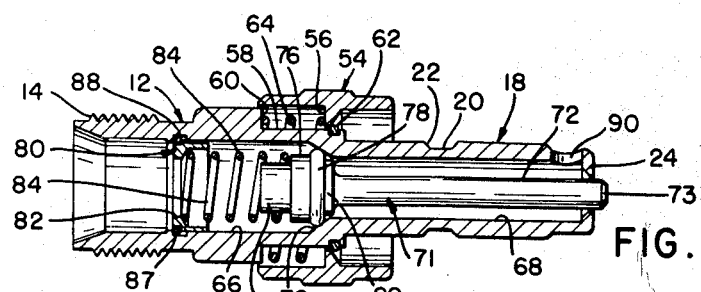
FIG. 2 is a longitudinal cross-sectional view of the male stem member of FIG. 1.

While this invention is susceptible to various modifications and alternative choices, there is shown in the drawings and herein described with particularity, a preferred embodiment. However, it is to be understood that it is not thereby intended to limit the invention to the particular form described but rather it is intended to cover all modifications and alternative constructions falling within the spirit and scope of the invention, as described in the appended claims.

Referring more specifically to the drawings, there is illustrated in FIG. 1 a double-end shut-off quick-connect tube coupling generally indicated at 10, embodying a preferred form of the present invention. The coupling 10 includes a valved male stem 12 which is provided with peripheral threads 14 for securing the stem to a tube (not shown) in a conventional manner which will be understood by those skilled in the art. The coupling 10 further includes a valved female coupling body generally indicated at 16, which is designed to be rotatably mounted on the stem 12 and which is longitudinally slidable with respect thereto during coupling and uncoupling. The male stem 12 is provided with an elongated tubular portion 18 at the end thereof remote from the threads 14. A peripheral groove 20 having sloped side walls 22 is formed in the outer wall of the tubular portion 18 and is located intermediate the ends thereof. The end of the tubular portion 18 remote from the threads 14 is provided with a radially inwardly directed flange 24 for purposes to be described.

In the preferred embodiment of the present invention, the illustrated valve hollow female body 16 has an externally threaded portion 26 at one end thereof for attachment to a tube (not shown) in conventional manner. The tubular coupling body 16 has rigidly mounted on the end opposite the threads 26 a substantially tubular body extension portion 28 which may, for example, be integral with the coupling body 16, or secured thereto by a threaded or swaged joint 30. A locking detent mechanism including a portion of the extension portion 28 is provided for cooperation with tubular portion 18 of the stem 12 to permit the female coupling body 16 to be quickly and positively locked and sealed on the male stem 12, while at the same time allowing the double-end shut-off quick-connect coupling to be capable of swiveling movement. The extension 28 is provided on the external periphery thereof with an enlarged intermediate or central portion 32 which defines a pair of axially spaced external radial shoulders 34 and 36. The body extension 28 at the central portion 32 has a plurality of radially tapered detent ball receiving openings 38 formed therein. The openings 38 are circumferentially disposed about the portion 28 and each opening is frustro-conical in shape with the minimum diameter of the openings 38 being less than the diameter of ball detents 40 disposed therein, such that the balls project slightly into the bore of the tubular extension 28 for engagement with the groove 20 and are, at the same time, restrained from falling through the openings 40 when the coupling members are uncoupled.

In order to retain the detents 40 within the openings 38, a sleeve 42 is provided on the body which has a radially directed flange 44 position adjacent the end of the body extension portion 28 in abutting relationship with a retaining ring 45 disposed in a groove in such portion. The body sleeve 42 has a bore portion 46 adjacent the flange 44 which is slightly larger in diameter than the portion 32 of the body portion 28 for slidable clearance thereover in the area of the detent receiving openings 38. An enlarged bore portion 48 is provided in the body sleeve bore adjacent the end opposite the flange 44 for clearance of a slightly enlarged portion 33 of the body portion 32 between the detent receiving openings 38 and the shoulder 34. The end of the portion 48, therefore, may slide toward the shoulder 34 of the body portion 28 into a closely spaced relation therewith.

Between the sleeve bore portions 46 and 48 is a tapered camming surface 50 which communicates the two portions of different diameter. In coupling and uncoupling the stem and body members, the portion 50 acts to cam the ball detents 40 into or out of engagement with the groove 20 and the bore portions 46 and 48 of the sleeve 42. When the sleeve is slid into closely spaced relationship with the shoulder 34, the bore portion 46 retains the ball detents in locking engagement in the groove 20 of the stem member, and when the sleeve 42 is in axial position such that the radial flange 44 abuts the retaining ring 45, the sleeve bore portion 48 forms a releasing cavity in which the balls may retract radially outward from the stem groove 20. Between the shoulder 36 on the body extension portion 28 and the flange 44 on the body sleeve 42 a coil spring 52 is provided normally to urge the body sleeve 42 outwardly into detent releasing position. On the stem member 12 is provided a stem sleeve 54 having a flange member 56 in close engagement with an enlarged portion of the stem 12 located between the elongated tubular portion 18 and the threaded portion 14 thereof. The enlarged portion 58 of the stem has a radially outwardly directed flange or shoulder 60 adjacent the threaded portion 14 and a retaining ring 62 adjacent the elongated tubular portion 18. The stem sleeve 54 is limited in axial sliding movement relative to the stem 12 by action of the radial flange 56 against the retaining ring 62. A coil spring 64 of greater strength than body sleeve spring 52 is positioned on the enlarged stem portion 58 between the shoulder 60 of the stem and the flange 56 of the stem sleeve normally to urge the stem sleeve flange against the retaining ring 62.

In coupling the members, the elongated tubular portion 18 is moved into the bore of the female coupling body 16 and slid axially thereof until the stem sleeve 54 abuts the body sleeve 42. As the axial advance of the stem sleeve into the bore of the female body continues, the greater force of the stem sleeve spring 64 overcomes the force of the body sleeve spring 52 and axially slides the body sleeve 42 forward with it. Thus, as the groove 20 in the tubular portion of the stem approaches radial alignment with the openings 38, the portion 48 of the body sleeve slides over the portion 33 of the body extension portion 28 and out of alignment with the openings 38, presenting the cam surface 50 against the detent balls 40 to effect a radial inward camming force on the ball detents 40.

Figure 4:
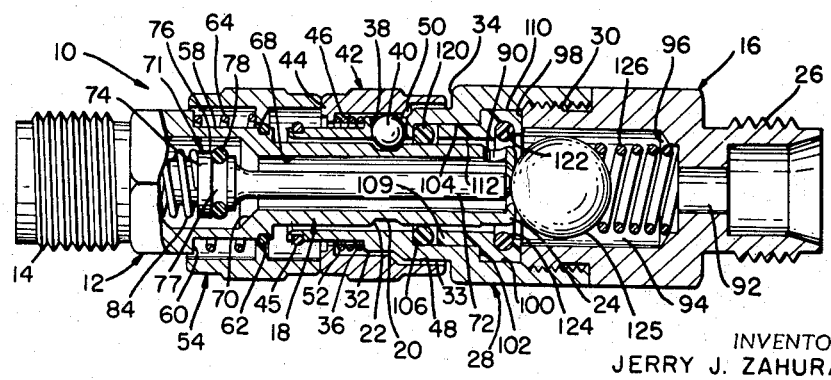
FIG. 4 is a longitudinal cross-sectional view of the tube coupling of FIG. 1 in fully connected position with both the stem valve and body valve open.

This radially directed inward force occurs just at the time the tapered sides 22 of the grooves 20 of the stem are aligned with the opening 38 and the ball rides down the tapered surface 22 as the body sleeve ball detent retaining portion 46 and the stem groove 20 come into radial alignment with the openings 38 to hold the ball detents 40 in the groove 20. In this position, the locking detent mechanism is in the locked state as shown in FIG. 4.

Figure 3:
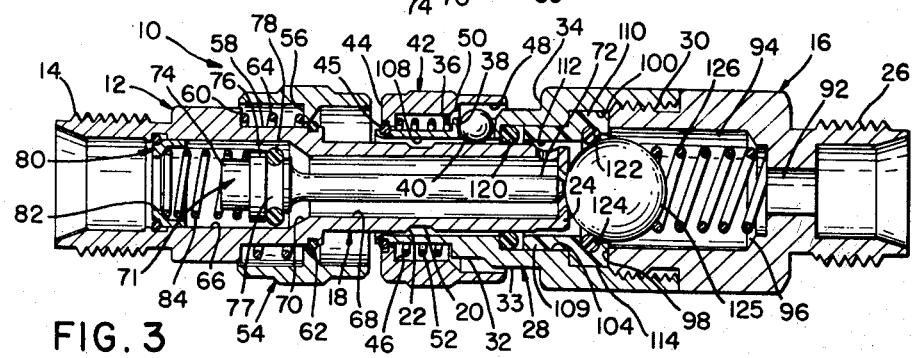
FIG. 3 is a longitudinal cross-sectional view of the tube coupling of FIG. 1 in partially connected position with the stem valve open and the body valve closed.

To effect an uncoupling, the stem sleeve 54 and/or the body sleeve 42 are moved manually axially toward the threads 14 of the stem member, both against the action of the stem sleeve spring 64 and with the action of the body sleeve spring 52 to position the body sleeve 42 in the ball detent releasing position with the bore releasing portion 48 in radial alignment with the openings 38. Simultaneously with this action, the stem is slid axially in a direction away from the body member 16 and the tapered sides 22 of the groove 20 cam the ball detents 40 radially outwardly into the opening 38 to unlock the stem from the coupling body as shown in FIG. 3, thereby to permit its complete separation therefrom.

Within the bore of the stem member 12 is an enlarged bore 66 and a coaxially aligned somewhat smaller bore portion 68 coextensive with the elongated tubular portion 18 thereof. The bore portions 66 and 68 of the stem member are separated by a tapered surface 70 which acts as the valve seat for the male stem valve. Cooperating with the seat 70 is an elongated valve core member 71 having a diameter substantially less than the diameter of the bore portion 68 throughout a portion 72 of its length extending from the valve seat 70 past the flange 24 and through the opening defined thereby so as to project through the end of the elongated tubular portion 18, and a somewhat enlarged head portion 74 with a diameter less than the diameter of the bore portion 66. The projecting end 73 of the portion 72 is chamfered to prevent inadvertent sticking of the core 71 on the surfaces of the flange 24. It will be noted that the inner edges of the flange 24 have been provided with a bevel to further facilitate the prevention of sticking. This bevel may be formed by a simple drilling operation at 90° to the inside surface of the flange 24 to produce a dish-shaped surface around the opening defined by said flange. The enlarged or head portion 74 of the core 71 has thereon a radially outwardly directed flange member 76 with a groove 77 bounded on the end thereof adjacent the seat 70 by a portion 89 of the flange 76. Disposed within the groove 77 of the core 71 is an O-ring seal 78 for cooperation with the tapered seat 70. Within an intermediate portion of the enlarged bore portion 66 of the stem coupling member 12 is a radially inwardly disposed spring retainer cup 80 having an inwardly directed flange 82 therein and a coil spring 84 abutting said flange 82 and the shoulder or flange 76 of the core 71. The cup 80 is retained against movement axially within the bore portion 66 by means of a conventional snap ring 87 seated in an appropriate groove 88 within the bore portion 66 of the stem 12.

As will be readily apparent the spring 84 normally urges the valve core 71 carrying the O ring 78 into sealing engagement with the tapered valve seat 70. In order to insure perfect axial alignment of the valve core within the bore of the stem member 12, the portion 89 of the shoulder or flange 76 defining the groove 77 for O ring 78, which is adjacent the tapered valve seat 70, is of a diameter slightly smaller than the diameter of the bore portion 68 of the stem 12 so that it may enter said bore slightly when the valve is closed.

In the end of the elongated tubular portion 18 of the coupling stem member 12 radial holes 90 are disposed adjacent the flange 24 such that flow through the stem member will occur through the holes 90 along the stem bore portion 68 through the clearance between the valve seat 70 and the O ring 78 into the stem bore portion 66. The flow upon entering the portion 66 proceeds through the turns of the spring 84, past the inwardly directed radial spring retainer cup flange 82 and out the end of the bore surrounded by the threads 14.

It is extremely important in the operation of the double-end shut-off quick-connect valve of this invention that the cross-sectional area provided by the holes 90 for the passage of fluid is at least equalled by the area defined between the turns of the spring 84 when in its compressed position with the valve core 71 unseated from the seat 70 by the maximum amount. This provision insures free flow of fluid through the stem member 12 of the coupling assembly, such that the amount of fluid entering the inlet ports of radial holes 90 for any given instant of time will exactly equal or at least not be substantially greater than the amount of fluid passing out of the stem 12 into the tube coupled thereto by means of the threads 14. In other words, no pressure will be allowed to build up within the stem or portion 66 which would act as a closing force on the valve core 70.

It is also important to the proper operation of the valve of the stem member of the coupling structure that the inwardly radially directed flange 24 on the end of the stem member extends for such a distance that it provides a sliding supporting engagement for the elongated portion 72 of the core extending therethrough. This positive support on the end of the valve core insures proper operation and axial movement of the valve during coupling and uncoupling of the stem member 12 from body member 16.

The valve coupling body member 16 and its extension portion 28 define a flow passageway of varying diameter with a spring-urged ball valve therein. Adjacent the opening in the body member 16, which is adapted to be coupled by means of threads 26 to a tube of a high pressure line, is a restricted bore 92 which opens on its end toward the extension portion 28 into a large cavity having a substantially larger bore 94. Between the smaller bore 92 and the larger bore 94 is a shoulder area 96. At the opposite end of the bore 94 is the end 98 of the body portion proper which defines with the adjacent bore portion 100 of the body extension portion 28 a groove having at the side opposite the end 98 an inwardly directed shoulder portion 102 of the elongated body extension 28. The shoulder 102 separates the bore portion 100 from the bore portion 104 which is of smaller diameter and which is communicated by means of a shoulder 106 with the smallest diameter portion 108 of the body extension portion through which the openings 38 permit the ball detents 40 to extend for engagement with the stem member 12.

In order to prevent complicated machining of internal grooves the sealing mechanism of the coupling is incorporated in the various bore portions of the body extension portion 28. The sealing mechanism comprises primarily a plastic insert 109 of Zytel, nylon, Delrin, Kel-F, Teflon, or some similar material which has a bore 112 of substantially the same diameter as the bore 108 of the portion 28. A radially outwardly extending shoulder portion 110 is provided on the end of the insert 109 adjacent the joint 30 on the female body coupling 16. The portion 110 is held under compression between the end 98 of the body portion 16 and the shoulder 102 of the portion 28 to act as a leaktight packing in the bore portion 100 of portion 28. The end of the insert 109 opposite shoulder 110 defines with the shoulder 106 of the body extension 28 a groove for the receipt of an O ring 120 which makes a seal with the elongated stem portion 14 upon contact therewith, but which provides for a sliding seal during coupling before the stem member 12 is inserted a sufficient distance to align the groove 20 radially with the openings 38 or during uncoupling after the groove 20 is moved out of radial alignment with the opening 38.

Within the insert bore 112, radially aligned with the bore portion 100 of the body extension 28, is a groove 122 having an O-ring valve seat 124 disposed therein under compression transferred from the compressed portion 110 of the insert. The seat 124 being closely disposed to the end 98 of the body member 16 coacts with a valve ball 125 of greater diameter than the inside diameter of the O-ring 124 but of less diameter than the bore portion 94 of the female body 16 to form the valve of the female body of the coupling assembly. The ball valve 125 is urged into its seat 124 by means of a spring 126 which abuts the ball 125 and the shoulder portion 96 of the body member 16.

The spring 126 must exert a greater force than the spring 84 of the male stem member, and the length of the bore 94 relative to the diameter of the ball 125 and the dimensions of the spring 126 must be such that during operation of the double-end shut-off quick-connect coupling, the turns of the spring 126 are never completely closed but always are open by an amount which totals an area at least the same as the cross-sectional area of the reduced diameter bore 92 in the female coupling body member 16. This, of course, is necessary to eliminate undesired distorting of the spring 126 due to pressure build-up within it as the fluid flows in the bore 92 through the turns of the spring 126 and past the ball 125 and seat 124 into the opening 90 in the elongated portion 18 of the stem member 12.

From the foregoing detailed description, it will be apparent that the double-end shut-off quick-connect coupling of this invention, upon being connected to tube ends of high pressure or vacuum line systems in a conventional manner, which will be readily understood by those skilled in the art, will provide for positive leaktight valve seals to prevent loss of pressure in the lines when in the uncoupled state. Furthermore, to couple the valve stem to the valve body member will be seen to require, particularly where the body member is attached to an instrument panel, the simple act of the insertion of the elongated portion 18 of the stem member 12 into the female body 16 and its extension portion 28, such that the end of the valve core 71 projecting past the flange 24 of the coupling stem member will engage the ball 125 of the female member valve.

Because of the relatively weaker force of the valve spring 84 acting against the valve core 71 in relation to the spring 126 acting against the ball 125 of the female body member 16, the valve of the stem member will be opened by separation of the O ring 78 from the valve seat 70 just subsequent to the establishment of a seal by means of the O ring 120 in the body extension portion 28 with the periphery of the elongated portion 18 of the stem member. With the stem valve open and the peripheral seal established as shown in FIG. 3, upon continuation of the insertion of the stem into the female body member 16, the end flange 24 of the elongated portion 18 of the stem member acts directly on the ball 125 of the valve of the female body member to compress the spring 126 normally urging said valve closed and thereby to open the valve of the female body member for flow therethrough and into the male stem member through the radial openings 90 in the elongated portion 18 thereof.

Simultaneously with this action of the valves, the stem sleeve 54 abuts against the body sleeve 42 and because of the superior force of the stem sleeve spring 64, in relation to the body sleeve spring 52 advances the body sleeve 42 from its normal detent release position into position whereby the camming surface 50 of the body sleeve 42 forces the ball detent radially inward. As the locking portion 46 of the body sleeve comes into communication with the ball detents to hold them, by this action the groove 20 on the elongated portion 18 of the stem member 12 comes into alignment with the radial openings 38 such that the ball detent may be received in the groove and locked therein by the body sleeve as shown in FIG. 4.

In this locked position, it is impossible for a stem member and body member to be separated by means of pressure in the line since with the body sleeve in locking position, the ball detents cannot move radially out of the groove 20 to permit disengagement of the stem from the body member. Accordingly, to uncouple the device it is necessary to slide the stem sleeve 54 manually either directly or by means of body sleeve 42 against the force of the spring 64, thereby to permit the spring 52 of the body sleeve, either by itself or in combination with manually applied force, to move axially until the detent release portion 48 is in radial alignment with the openings 38. Upon thus moving the sleeves of the coupling, the ball detents are free to be cammed radially outward by the tapered sides 22 of the groove 20 as the stem member is pulled from the locked position in the female body member.

As is evident from the description and drawing, the valve ball 125 engages the O ring 124 as the stem member is moved out of the locked position to close the female body member valve. As the stem member is retracted further, the flange 24 disengages the ball 125 and the action of the spring 84 against the valve core 71 of the stem member closes the stem valve by engagement of the O ring 78 against the valve seat 70. Then, as the disassembly continues, the O ring 120 and the elongated portion 18 of the stem member are disengaged to break the peripheral seal formed previously and the coupling disconnection is completed.

For ease of description, the principles of the invention have been set forth in connection with but a single illustrated embodiment showing a double-end shut-off quick-connect. It is not my intention, however, that the illustrated embodiment nor the terminology employed in describing it be limiting inasmuch as variations of these may be made without departing from the spirit of the invention. Rather, I desire to be restricted only by the scope of the appended claims.

The invention claimed is:

1. An improved double-end shut-off quick-connect tube coupling comprising in combination:
   a hollow male stem having a valve seat with a spring urged elongated valve core therein;
   a hollow female coupling body having a detent carrying portion and a valve seat with a spring urged valve ball therein rotatably mounted on said stem;
   a plurality of detents positioned in radial tapered openings formed in said detent carrying portion;
   a peripheral locking groove in said male stem;
   body sleeve means on said body having a portion for camming said detents radially inward into locking engagement with said groove, a portion for retaining said detents in said groove, and a portion for releasing said detents from said groove;
   spring means normally urging said body sleeve means axially into detent releasing position;
   stem sleeve means on said stem;
   spring means normally urging said stem sleeve axially against said body sleeve to maintain said body sleeve in detent retaining position with a force opposite to and greater than the force of the spring means normally urging said body sleeve means;
   said ball being urged into said coupling body valve seat by a force opposite to and greater than the force urging said core into said stem valve seat;
   said core normally projecting from the end of said stem and abutting said ball such that said core is retracted into said stem and unseated when said body sleve is in detent camming position and said stem end abuts said ball, and said ball is unseated when said body sleeve is in detent retaining position, thereby insuring that said core is unseated to open the stem valve before said valve ball is unseated to open said body valve.

2. An improved double-end shut-off quick-connect tube coupling comprising in combination:
   a hollow valved male stem;
   a hollow valved female body rotatably mounted on said stem;
   detents retained in radial openings in said body;
   a detent receiving locking groove in the periphery of said stem;
   a detent releasing and locking sleeve normally urged in releasing position on said body;
   a spring urged sleeve on said stem forcing and maintaining said detent releasing and locking sleeve in locking position;
   spring means of one force magnitude acting on a movable portion of the stem valve to urge said stem valve closed and spring means of an opposite and greater force magnitude acting on a movable portion of the body valve to urge said body valve closed;

said spring urged portion of said stem valve abutting said spring urged portion of said body valve thereby maintaining said stem valve open by means of the opposite and greater force magnitude acting to urge said body valve closed;

a portion of said stem engaging said spring urged portion of said body valve to maintain said valve open against the spring force acting to urge said body valve closed.

3. The tube coupling of claim 2 in which the spring urged portion of the body valve is a ball.

4. The tube coupling of claim 2 in which the female body includes an O ring in the bore thereof at a location which causes it to sealingly engage the male stem at all times when either the spring urged portion of the stem valve or the spring urged portion of the body valve is in other than its normally spring urged closed position.

5. The tube coupling of claim 2 in which the spring urged portion of the stem valve carries an O ring for sealing engagement with the stem valve seat and the stem valve seat is tapered to receive said O ring.

6. The tube coupling of claim 2 in which the hollow valved male stem has radial openings in the portion of said stem engaging the spring urged portion of the female body valve.

7. The tube coupling of claim 2 in which the body valve includes a valve seat comprising an O ring seated in a resilient organic insert.

8. The tube coupling of claim 2 in which the end of said spring urged portion of said stem valve abutting said spring urged portion of said body valve is tapered.

9. An improved double-end shut-off quick-connect tube coupling comprising in combination:
a hollow male stem having a tapered valve seat with a spring urged elongated valve core therein;
an O ring on said valve core for engagement with said valve seat;
a hollow female coupling body having a detent carrying portion and a valve seat with a spring urged valve ball therein rotatably mounted on said stem;
said female body valve seat comprising an O ring seated in a resilient plastic insert;
a plurality of detents positioned in radial tapered openings formed in said detent carrying portion;
a peripheral locking groove in a cylindrical portion of said male stem which is of suitable dimension to fit within said female body;
body sleeve means on said body having a portion for camming said detents radially inward into locking engagement with said groove, a portion for retaining said detents in said groove, and a portion for releasing said detents from said groove;
spring means normally urging said body sleeve means axially into detent releasing position;
stem sleeve means on said stem;
spring means normally urging said stem sleeve axially against said body sleeve to maintain said body sleeve in detent retaining position with a force opposite to and greater than the force of the spring means normally urging said body sleeve means;
said ball being urged into said coupling body valve seat by a force opposite to and greater than the force urging said core into said stem valve seat;
said core normally projecting from the end of said stem and abutting said ball such that said core is retracted into said stem and unseated when said body sleeve is in detent camming position and said stem end abuts said ball, and said ball is unseated when said body sleeve is in detent retaining position, thereby insuring that said core is unseated to open the stem valve before said valve ball is unseated to open said body valve.

10. The structure of claim 9 in which the O ring on said valve core is mounted in a groove in the periphery of said core which groove is defined on the side adjacent the valve seat by a flange having a lesser diameter than the internal diameter of the valve seat and on the opposite side by a flange having a greater dameter than the internal diameter of the valve seat such that when the O ring mounted in the groove comes into engagement with the tapered stem seat, the O ring is urged against the flange having the greater diameter and the flange having the lesser diameter acts to hold the valve core in coaxial relation to the valve seat and the valve stem.

References Cited by the Examiner

UNITED STATES PATENTS

| 1,294,913 | 2/19 | Johnson | 137—614.03 |
| 1,828,505 | 10/31 | Mahoney | 137—514.04 XR |
| 2,599,935 | 6/52 | Paskker | 137—614.04 |
| 2,934,090 | 4/60 | Kenann | 251—363 XR |

FOREIGN PATENTS

| 572,648 | 3/59 | Canada. |
| 828,964 | 2/60 | Great Britain. |

ISADOR WEIL, *Primary Examiner.*

WILLIAM F. O'DEA, *Examiner.*